June 2, 1953

C. R. SCORDO ET AL 2,640,457

INVENTORY AGING DISPLAY DEVICE

Filed Aug. 2, 1949

INVENTOR.
CARMINE R. SCORDO
GEORGE W. WASSELL
BY FRANK LLOYD WASSELL their ATTORNEYS

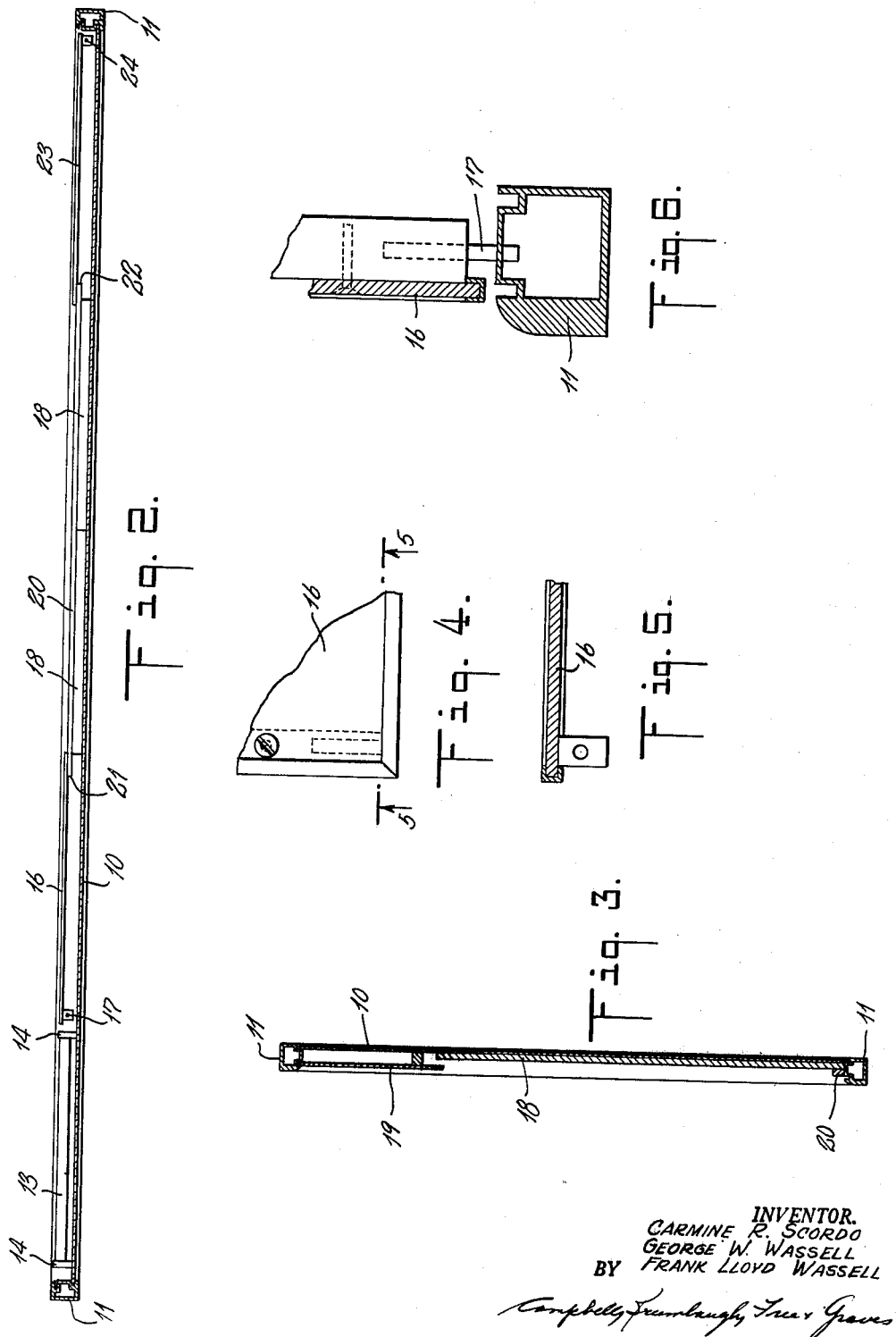

Patented June 2, 1953

2,640,457

UNITED STATES PATENT OFFICE 2,640,457

INVENTORY AGING DISPLAY DEVICE

Carmine R. Scordo, South Norwalk, and George W. Wassell and Frank Lloyd Wassell, Westport, Conn., assignors to Georgene Parkin Wassell, Westport, Conn.

Application August 2, 1949, Serial No. 108,184

4 Claims. (Cl. 116—136)

The present invention relates to indicator boards and embodies, more specifically, an improved form of board in which, for each of a plurality of items, indications may be displayed showing the age of each of the items. It is an object of the invention to provide an indicating device of the above character, wherein a plurality of indicia may be displayed preferably in columnar form and information with respect thereto also displayed and, in combination with such indicia and information, of providing movable mechanism of such form that the movement thereof will result in maintaining an accurate and visual indication of the age of each of the items represented by the foregoing indicia.

Another object of the invention is to provide, in an indicating device of the above character, movable mechanism which will indicate the age in days or any other desired units of time and which will enable the continuous use of the mechanism for cycles of 30, 60, and a similar number of intervals or periods of time.

Further objects of the invention will be apparent as it is described in greater detail in connection with the accompanying drawings, wherein Figure 1 is a view in front elevation showing an indicating mechanism constructed in accordance with the present invention;

Figure 2 is a bottom view in horizontal section, taken on the line 2—2 of Figure 1, and looking in the direction of the arrows;

Figure 3 is a view in transverse cross-section, taken on the line 3—3 of Figure 1, and looking in the direction of the arrows;

Figure 4 is an enlarged detailed view showing one corner of a hinged indicating panel of the device shown in Figure 1;

Figure 5 is a view in section, taken on line 5—5 of Figure 4, and looking in the direction of the arrows; and Figure 6 is an enlarged partial view, taken on the line 6—6 of Figure 1, and looking in the direction of the arrows.

Figure 1:
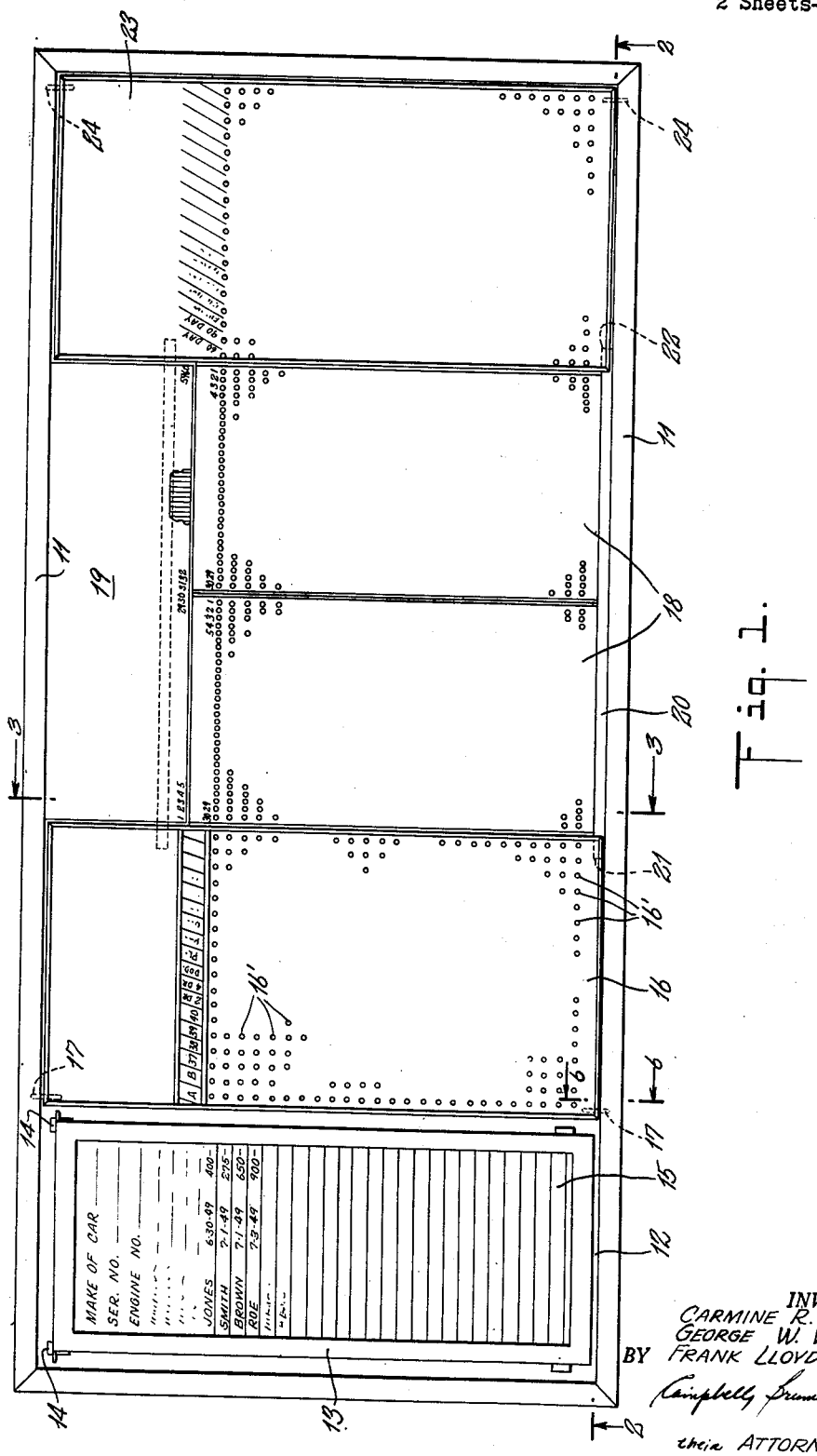

Referring to the above drawings, the indicating apparatus is shown as comprising a board 10 having top and bottom marginal rims 11 and a left-hand side panel 12. Upon the panel 12 a visible card index file 13 may be provided, being mounted in position by suitable mounting brackets 14, the details of which form no part of this invention. It is sufficient to note that the faces of the cards adjacent the bottom edges thereof, such as for example, card 15, serve as the indicia providing spaces for the items or subjects as to which information is to be displayed by the board as hereinafter described.

Adjacent to the panel 12, a panel 16 is provided, being hinged upon pivots 17 between the top and bottom rims 11 of the indicating board. This mounting of the panel 16 permits it to be swung into a position at an angle to the plane of the board and to facilitate the insertion of movable panels 18, presently to be described. The hinged panel 16 is provided with a plurality of recesses or apertures 16' within which pegs or similar indicating mechanism may be inserted to provide an indication with respect to each of the various indicia 15 carried by the visible card index file 13. For example, if the board is to be used as an aging board to display the age of used cars of an inventory, information as to each of the cars is placed upon the respective cards as illustrated on the top card of the card index file 13. The face of the card adjacent the bottom edge of each of the cards may contain the name of the person from whom the car was purchased, the amount, and date. Upon the hinged panel 16, a series of columns may be provided to designate the year, model, and make of the cars and such other information as may be important.

A plurality of movable indicator boards 18 are slidably mounted upon the board to the rear of the hinged panel 16, as illustrated in Figure 2. These panels lie behind a top plate 19, the bottom edge of which lies below the top edge of the panels 18, and the bottom edges of the panels 18 lie behind a stationary retaining strip 20 which terminates at 21 and 22, as illustrated in Figure 1. In this fashion the panels 18 are slidable in a plane parallel to the plane of the board 10 and can be inserted behind the plate 19 and strip 20 by swinging the hinged panel outwardly and inserting the panel in the aforesaid position.

In the normal use of the board the panels are moved from left to right, as seen in Figure 1, and when a panel moves beyond its desired maximum indicating position, it will be concealed by a panel 23, hinged at 24 to the top and bottom rims 11 similar to the manner in which the hinged panel 16 is mounted. The panel 23 is provided with apertures or recesses in columns and horizontally lined form, the various columns being designated by suitable indicia to indicate, for example, cars that are 60, 90 and a greater number of days old, and also, other information that may be of importance.

Each of the slidable panels 18 is provided with a plurality of rows of holes which are in columnar form and which are formed to align with the holes in the hinged panels 16 and 23, as illustrated in Figure 1.

Upon the top plate 19 and at the lower edge thereof, there are displayed in consecutive series numbers from 1 to 60, which will indicate the inventory age of each of the items designated by the indicia 15, and for each of which a peg has been inserted in the proper hole of the movable panel. At the top of each of the slidable boards 18 and extending from right to left, the numbers from 1 to 30 are placed in series above each of the respective columns of holes. Thus, each of the slidable boards or panels 18 can represent a period of 1 month, and each of the columns on each of the boards will represent the respective days of that month. If, on the first day of the month (when the slidable board is entirely concealed behind the hinged panel 16 but for the right-hand column of holes on the board under column 1), a car is purchased, a card is made out for such car and placed in the visible card index file 13. The bottom edge of this card thus serves as an indicia 15, and a peg is inserted in the hole of the column 1 on the panel 18 that is horizontally aligned with such indicia. Each day the board is advanced one number to the right, and the numerical scale on the top plate 19 thus shows at a glance the precise age of any car indicated by a peg in any of the exposed holes on the slidable panels 18. If desired, the scale numerals 31 to 60 on the top plate 19 may be colored red to give emphasis to the increasing age of the items indicated by the pegs that lie beneath such numerals on the movable panels 18.

As above mentioned, operation of the mechanism herein specifically described results in the movable panels 18 eventually becoming entirely concealed behind the right-hand hinged panel 23. As the columns of holes on the movable panels 18 disappear behind the hinged panel 23, the pegs that remain thereon are removed and placed in the stationary columns on the hinged panel 23. This mechanism thus requires three slidable panels 18 in order that it may function continuously in the manner described.

While the invention has been described with specific reference to the accompanying drawings, it is not to be limited save as defined in the appended claims.

We claim:

1. Indicating apparatus comprising a board, a panel member having a plurality of indicia receiving spaces at one side of the board, and a movable indicator board member slidable on the board, the movable indicator board member having a plurality of horizontal rows of apertures in horizontal alignment with the indicia receiving spaces of the panel member, the apertures in each row forming a plurality of columns with the corresponding apertures in the other rows, the movable indicator board member further being slidable to the rear of the panel member in a plane parallel to the plane of the board and in a direction parallel to the horizontal rows of the apertures.

2. Indicating apparatus comprising a board, a plurality of spaced panel members on the board, each panel member having a plurality of indicia receiving spaces, and a movable indicator board member slidable on the board, the movable indicator board member having a plurality of horizontal rows of apertures in horizontal alignment with the indicia receiving spaces of the panel members, the apertures in each row forming a plurality of columns with the corresponding apertures in the other rows, the movable indicator board member further being slidable to the rear of at least one of the panel members in a plane parallel to the plane of the board and in a direction parallel to the horizontal rows of apertures.

3. Indicating apparatus comprising a board, a panel member having a plurality of indicia receiving spaces at one side of the board, and a plurality of movable indicator board members slidable on the board, the movable indicator board members each having a plurality of horizontal rows of apertures in horizontal alignment with the indicia receiving spaces of the panel member, the apertures in each row forming a plurality of columns with the corresponding apertures in the other rows, the movable indicator board members further being slidable to the rear of the panel member in a plane parallel to the plane of the board and in a direction parallel to the horizontal rows of apertures.

4. Indicating apparatus comprising a board, a panel member having a plurality of indicia receiving spaces at one side of the board, a movable indicator board member slidable on the board, the movable indicator board member having a plurality of horizontal rows of apertures in horizontal alignment with the indicia receiving spaces of the panel member, the apertures in each row forming a plurality of columns with the corresponding apertures in the other rows, the movable indicator board member further being slidable to the rear of the panel member in a plane parallel to the plane of the board and in a direction parallel to the horizontal rows of apertures, and a top plate on the board having a plurality of indicia along the bottom edge of the plate in cooperative relationship with the columns of apertures on the movable indicator board member.

CARMINE R. SCORDO.
GEORGE W. WASSELL.
FRANK LLOYD WASSELL.

References Cited in the file of this patent

UNITED STATES PATENTS

| Number | Name | Date |
| --- | --- | --- |
| 330,577 | Graham | Nov. 17, 1885 |
| 444,396 | Hull | Jan. 6, 1891 |
| 588,805 | Reynolds | Aug. 24, 1897 |
| 733,834 | Glidden | July 14, 1903 |
| 917,864 | Hildenbrand | Apr. 13, 1909 |
| 1,375,464 | MacDonagh | Apr. 19, 1921 |
| 1,853,076 | Nygaard | Apr. 12, 1932 |
| 1,860,763 | Adamiecki | May 31, 1932 |
| 2,519,724 | Whitaker | Aug. 22, 1950 |

FOREIGN PATENTS

| Number | Country | Date |
| --- | --- | --- |
| 620,777 | Great Britain | Mar. 30, 1949 |